UNITED STATES PATENT OFFICE.

AUGUST VAGT, OF MÜLHEIM-ON-THE-RHINE, GERMANY, ASSIGNOR TO FARBENFABRIKEN VORM. FRIEDR. BAYER & CO., OF ELBERFELD, GERMANY, A CORPORATION OF GERMANY.

REDUCTION PRODUCTS OF COMMERCIAL NITROBENZALDEHYDE.

961,915.   Specification of Letters Patent.   Patented June 21, 1910.

No Drawing.   Application filed October 26, 1909.   Serial No. 524,666.

*To all whom it may concern:*

Be it known that I, AUGUST VAGT, doctor of philosophy, chemist, citizen of the German Empire, residing at Mülheim-on-the-Rhine, Germany, have invented new and useful Improvements in Reduction Products of Commercial Nitrobenzaldehyde, of which the following is a specification.

My invention relates to a new and valuable process for recovering some of the products formed in the reduction of commercial nitrobenzaldehyde. This latter substance is a mixture of isomeric nitrobenzaldehydes and hitherto the products formed by their reduction among which there were various products of condensation of the reduced nitrobenzaldehydes could only be separated with the greatest difficulty and by operations giving a very small yield. I have now discovered that two of the products of reduction namely meta-aminobenzaldehyde and the anhydrid of ortho-aminobenzaldehyde of the formula

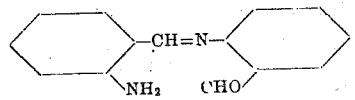

can be isolated by treating the reduction mixture with such a quantity of an acid that the above anhydrid is precipitated while the meta-aminobenzaldehyde remains in solution in the form of the corresponding salt.

In order to illustrate the new process more fully the following example is given, the parts being by weight:

2.19 parts of nitrobenzaldehyde of commerce (mixture of nitrobenzaldehydes containing about 25 per cent. of ortho-nitrobenzaldehyde) are reduced to the aminobenzaldehydes by heating them to boiling together with 10 parts of concentrated sodium hydrosulfite in powder form containing about 80% of sodium hydrosulfite and 100 parts of water. After 10 minutes the mixture is allowed to cool to 50° C. and 14.7 parts of hydrochloric acid of 16° Bé. are added which neutralizes the bases. Subsequently the mixture is heated to remove the sulfurous acid. On cooling, the anhydrid of ortho-aminobenzaldehyde separates, which is filtered off. From the filtrate which is a hydrochloric acid solution of meta-aminobenzaldehyde the free meta-aminobenzaldehyde is isolated by rendering this solution alkaline and extracting the same by means of ether and finally evaporating the ether.

Other acids such as oxalic acid, sulfuric acid, etc., can be used.

I claim:—

The process of separating the anhydrid of ortho-aminobenzaldehyde from meta-aminobenzaldehyde by adding an acid to the mixture obtained by reducing commercial nitrobenzaldehyde in such quantity that the anhydrid precipitates while the meta-aminobenzaldehyde remains in solution in the form of its corresponding salt substantially as described.

In testimony whereof I have hereunto set my hand in the presence of two subscribing witnesses.

AUGUST VAGT. [L. S.]

Witnesses:
OTTO KÖNIG,
CHAS. J. WRIGHT.